United States Patent
Berkovits

[15] 3,635,224
[45] Feb. 18, 1972

[54] SAFE RATE PACER

[72] Inventor: Barouh V. Berkovits, Newton Highlands, Mass.

[73] Assignee: American Optical Corporation, Southbridge, Mass.

[22] Filed: Feb. 10, 1970

[21] Appl. No.: 10,225

[52] U.S. Cl. ...........................................128/419 P, 128/422
[51] Int. Cl. .........................................................A61n 1/36
[58] Field of Search ....................128/419 P, 419 R, 421, 422

[56] References Cited

UNITED STATES PATENTS

| | | | |
|---|---|---|---|
| 3,474,353 | 10/1969 | Keller, Jr. | 128/419 P |
| 3,454,012 | 7/1969 | Raddy | 128/419 P |
| 3,426,748 | 2/1969 | Bowers | 128/419 P |

*Primary Examiner*—William E. Kamm
*Attorney*—William C. Nealon, Noble S. Williams, Robert J. Bird and Amster and Rothstein

[57] ABSTRACT

A pacer which is not susceptible to a runaway rate condition no matter how many batteries fail and does not cease pacing even if several batteries fail. The timing circuit employed includes a capacitor which charges from a charging potential. When the capacitor voltage reaches a threshold potential, a pulse is generated. The charging potential is derived from a series string of batteries. The threshold potential is derived at the junction of a diode and a resistor, the diode and the resistor being connected in series across the string of batteries. The threshold potential is thus equal to the charging potential less the essentially constant drop across the diode. Battery failures result in an increase in the pulsing rate, but as long as pacing continues the pulsing rate does not approach a dangerous level.

14 Claims, 5 Drawing Figures

PATENTED JAN 18 1972 3,635,224
SHEET 1 OF 2
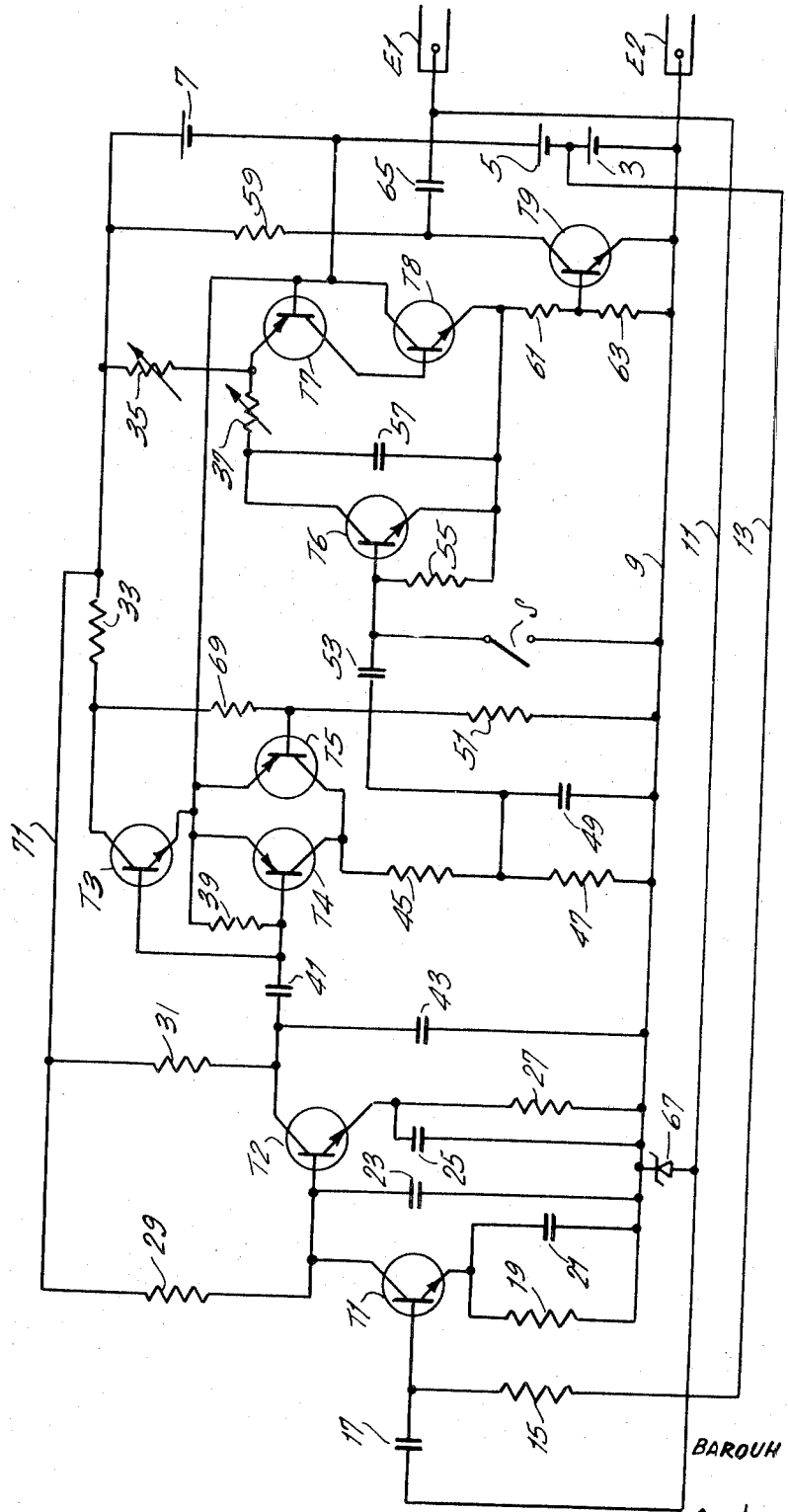
FIG. I
FIG. 2
INVENTOR.
BAROUH V. BERKOVITS
Amster & Rothstein
ATTORNEYS

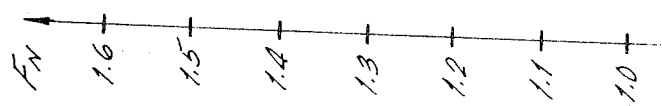
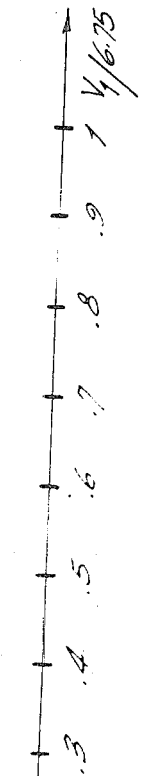
FIG. 5
FIG. 3
FIG. 4

SAFE RATE PACER

This invention relates to pacers, and more particularly to pacers having safeguards against battery failures.

A typical implantable pacer, of either the continuous or demand type, includes a number of miniature batteries connected in series. The different potentials which are required to bias the various transistors in the pacer can be derived at respective junctions of the batteries. It is a well-known phenomenon that the various batteries in the pacer do not age at the same rate. It is possible for the potential of one battery, for example, to drop to an insignificant level without any substantial change taking place in the other batteries. Depending on which battery or batteries fail, in a typical prior art pacer it is possible for even a single battery failure to cause pacing to stop altogether, or for the pacer rate to rise to a dangerous level.

It is a general object of my invention to provide a battery arrangement for a pacer in which the failure of even several of the batteries does not cause pacing to stop and in which the pacing rate is prevented from rising to a dangerous level.

It is another object of my invention to provide such an arrangement in which the pacer rate is dependent upon all batteries to the same extent, that is, the failure of any battery causes no greater change than the failure of any other battery. (It is apparent that in such a case maximum protection is afforded; there is no battery whose continued functioning is critical to the pacer operation.)

In a typical pacer, the pacing rate is determined by the charging and discharging of a capacitor between minimum and maximum potentials. For example, the capacitor may be discharged at the beginning of each timing interval and may charge from the maximum available potential. When the capacitor charges to a threshold potential a stimulating pulse may be generated. The threshold potential is generally lower than the maximum available potential of the unit. Typically, the charging and threshold potentials are derived by connecting several batteries in series with taps at the battery junctions.

In accordance with the principles of my invention, the charging potential for the timing circuit is derived by connecting several batteries in series, as in the prior art. But the lower threshold potential is not derived from a tap at one of the battery junctions. Instead, the full charging potential is connected across a resistor-diode circuit. The threshold level is determined by the potential at the junction of the resistor and diode, which potential is the full charging potential, less the drop across the diode. A failure in one or more batteries causes both the charging potential and the threshold level to drop by the same amount. The pacer rate is determined by the ratio of the two potentials. A failure of even several of the batteries causes the potential ratio and the pacer rate to increase, but not dangerously. The continued functioning of no single battery is critical to the system operation. Moreover, the magnitude of the increase in the pacer rate serves to provide an indication to the physician of the number of batteries which have failed, and allows corrective measures to be taken in sufficient time.

It is a feature of my invention to derive charging and threshold potential levels for a pacer pulse generator by placing a plurality of series-connected batteries across a resistor-diode circuit, the full battery circuit potential serving as the charging voltage for the pulsing circuit and the potential at the junction of the resistor and diode serving as the threshold level.

Further objects, features and advantages of my invention will become apparent upon a consideration of the following detailed description in conjunction with the drawing, in which:

FIG. 1 is the same as FIG. 1 in my copending application Ser. No. 727,129, filed on Apr. 11, 1968, which has matured into U.S. Pat. No. 3,528,428 and depicts a pacer of the type in which the threshold potential for the charging circuit is derived from a tap off the series-connected batteries;

FIG. 2 depicts a typical electrocardiogram;

FIG. 3, the illustrative embodiment of the present invention, depicts the changes required in the circuit of FIG. 1;

FIG. 4 depicts with greater clarity that part of the circuit of FIG. 3 in which the charging potential ($V_1$) and the threshold potential ($V_2$) are derived; and FIG. 5 is a graph depicting variations of the pacer rate as the total potential of the series-connected batteries changes.

The pacer of FIG. 1 can be operated in either a continuous or demand mode. Electrodes E1 and E2 are implanted in the patient's heart, electrode E2 being the neutral electrode and electrode E1 being positioned to stimulate the ventricles. In the demand mode (switch S open), current flows between electrodes E1 and E2 to stimulate the ventricles only when an electrical stimulus is required. In the continuous mode (switch S closed), stimuli are generated at a fixed rate.

Capacitor 65 serves to provide a source of current when an impulse is needed. When transistor T9 conducts, the capacitor discharges through the electrodes. Capacitor 57 charges through potentiometers 35 and 37 until the voltage across it causes transistors T7 and T8 to conduct. At that time, capacitor 57 discharges through potentiometer 37 and transistors T7 and T8, transistor T9 conducts, and an impulse is delivered to the patient's heart from capacitor 65. The setting of potentiometer 37 controls the time taken for capacitor 57 to discharge, that is, the width of each impulse. The setting of potentiometer 35 (along with the setting of potentiometer 37) controls the time required for capacitor 57 to charge to that level which causes conduction of transistors T7 and T8, that is, the interpulse interval. In the absence of conduction of transistor T6 (for example, with switch S closed), capacitor 57 continuously charges and discharges, and impulses are supplied to the patient's heart at fixed intervals determined by the setting of the potentiometers.

For demand operation, switch S is opened to allow transistor T6 to conduct. Electrode E1 is coupled over conductor 11 to the base of transistor T1 through capacitor 17. A representative ECG trace is shown in FIG. 2, and transistors T1 and T2 amplify the R-wave signal on electrode E1 resulting from a ventricular contraction. (Excessive signals are shorted through Zener diode 67 to prevent damage to transistor T1.) Following detection of an R wave, a positive pulse is delivered to the base of transistor T6. Transistor T6 turns on and capacitor 57 discharges through it. Thus, although the capacitor was previously charging to the level which would have resulted in the generation of an impulse, it is discharged and a new timing interval begins. This arrangement insures that an impulse is not generated if a natural heartbeat has occurred. The timing interval is such that impulses are generated with an interpulse interval slightly in excess of the desired natural interbeat interval. Only if a natural heartbeat is missing is a stimulating impulse generated.

The remaining transistors in the circuit serve to prevent conduction of transistor T6 in the presence of noise. In the presence of noise it would otherwise be possible for transistor T6 to conduct and prevent the generation of an impulse even though one is required. For this reason, when the pacer detects extraneous noise, transistor T6 is prevented from operating and impulses are delivered at a fixed rate.

With switch S open, as shown, the pacer operates in the demand mode as just described. However, with switch S closed, the base of transistor T6 is held at the potential of conductor 9. In such a case, pulses transmitted through capacitor 53 do not turn on the transistor. Capacitor 57 is not discharged through transistor T6 and each time the capacitor voltage rises to the point where transistors T7 and T8 conduct, a stimulating pulse is generated. The pacer thus operates in the continuous mode. A more complete description of the operation of the circuit of FIG. 1 is set forth in my above-identified copending application.

The pacer of FIG. 1 includes three batteries 3, 5 and 7. Typically, battery 3 may be rated at 1.35 volts and each of batteries 5 and 7 may be rated at 2.70 volts. (In actual practice, each of batteries 5 and 7 illustrated in the drawing might comprise two series-connected 1.35-volt batteries.) Three different DC potentials are required in the circuit of FIG. 1. For the proper biasing of the base of transistor T1, a 1.35-volt potential is extended to it through resistor 15. This potential is derived by tapping off the voltage at the junction of batteries 3 and 5. The base of transistor T7 is biased at 4.05 volts; it is coupled directly to the junction of batteries 5 and 7. The full potential of 6.75 volts is used for biasing many of the transistors (T3, T9, etc.) and also as the source of the charging current for capacitor 57, the charging current flowing from the 6.75-volt supply through resistors 35 and 37, capacitor 57, and resistors 61 and 63.

The pulsing rate is determined primarily by two potentials—the threshold potential at the base of transistor T7 and the charging potential at the upper end of potentiometer 35. Following the generation of a pulse and the discharge of capacitor 57 through transistors T7 and T8, the voltage at the junction of capacitor 57 and potentiometer 37 is at a minimum. The base potential of transistor T7 is greater than its emitter potential and the transistor is maintained off. As the charging current flows, the voltage across capacitor 57 rises until the emitter of transistor T7 is at a potential sufficient to turn on the transistor. With this operation of the timing circuit in mind, it can be shown that a failure of one or more of the batteries can give rise to a dangerous condition.

For example, suppose that battery 7 fails, that is, the potential across it becomes negligible. In such a case, the threshold potential at the anode of battery 5 (the base of transistor T7) is the same as the charging potential at the upper end of potentiometer 35. Even if capacitor 57 charges to the fullest extent, the potential at the emitter of transistor T7 cannot exceed the potential at its base; transistors T7 and T8 remain nonconducting and no more pulses are generated at electrode E1. Even if battery 7 comprises two separate 1.35-volt batteries, rather than a single 2.70-volt battery, the failure of one of the two batteries can slow down the pulsing rate to a dangerous level. Since the effective potential toward which capacitor 57 charges is only half as high above the threshold level than before the battery failure, it is apparent that a much longer time is required until capacitor 57 charges to a level sufficient to trigger transistor T7.

On the other hand, suppose that one of batteries 3 and 5 fails. In such a case, both the threshold and charging potentials are decreased. But because battery 7 is still operative, the percentage change in the charging potential is much less than the percentage change in the threshold level. It requires much less time for capacitor 57 to charge to that level at which the emitter potential of transistor T7 is greater than the base potential by an amount sufficient to turn the transistor on. In such a case, a significant increase in the pacer rate may take place. And if there is a failure of two of the three batteries between the base of transistor T7 and conductor 9 (assuming that battery 5 is in actuality two 1.35-volt batteries), the pacer rate may increase to a level disastrous to the patient.

The problem with a battery arrangement such as that of FIG. 1 is that a failure of any individual battery (and certainly any two) can be critical. There is no redundancy in the circuit—the still operative batteries cannot make up for the malfunctioning batteries.

The pacer of FIG. 3 (only the rightmost portion of which is shown since the remainder of the circuit is the same as that of FIG. 1) incorporates the following changes (the use of two batteries 6, 7 instead of only one, and the use of two batteries, 4, 5 instead of only one, is not a change in practice inasmuch as the pacer of FIG. 1 in a commercial design would in the usual case include a pair of 1.35-volt batteries wherever a 2.70-volt battery is required):

1. Conductor 14 (not labeled in FIG. 1) is still coupled to the junction of batteries 5 and 7, but is not connected to the base of transistor T7.

2. The five series-connected batteries are placed across the series circuit including diodes 8 and 10, and resistor 12, with the base of transistor T7 being connected to the junction of diode 10 and resistor 12.

Before proceeding with a description of the operation of the charging circuit, it should be noted that the potential of conductor 13 is still derived by tapping off the voltage at the junction of batteries 3 and 4, and the potential of conductor 14 is still derived by tapping off the voltage at the junction of batteries 5 and 7. It is, of course, possible to derive potentials on these two conductors with the use of additional diode networks. However, battery failures do not seriously affect any circuits other than the timing circuit (including transistors T7 and T8), and for this reason it is not necessary to provide diode circuits to derive the other bias potentials. For example, suppose that battery 3 fails. In such a case there is no potential difference between conductors 9 and 13, transistor T1 is not biased to conduction, and the transistor will not conduct properly responsive to each detected ventricular beat. However, the net effect of an inoperative transistor T1 is that a pulse is not transmitted through capacitor 53 to the base of transistor T6. This is the same as shorting the base of transistor T6 through a closed switch S to conductor 9—transistor T6 does not conduct to discharge capacitor 57 and the pacer operates in the continuous mode. While the demand operation is generally preferred, continuous pacing is not usually dangerous. Similarly, even if two or all three of batteries 3, 4 and 5 fail and the potential on conductor 14 is insufficient for controlling the conduction of either transistor T4 or T5, the only effect of the battery failures is that once again transistor T6 is not turned on responsive to a ventricular beat.

It is of interest to note that the circuit of FIG. 3 also represents the complete schematic of a fixed rate pacemaker. The six conductors extending to the left may simply be disregarded (omitted). Similarly, transistor T6 (together with resistor 55) may be omitted since they perform no function in a fixed rate mode of operation. In such a case, there are no battery taps at all, and all of the batteries are fully equivalent to each other in that a change in any battery has the same effect on the pacer operation as the same change in any other battery.

The danger in the circuit of FIG. 1 is that the ratio of the charging potential (at the top of potentiometer 35) to the threshold potential (at the base of transistor T7) can change to a considerable extent even if only one battery fails. A failure in one of the two 1.35-volt batteries from which battery 7 of FIG. 1 is comprised may cause the pulsing rate to be reduced significantly and a failure in both batteries will cause pacing to stop altogether. A failure in one or more of the batteries connected between the base of transistor T7 and conductor 9 may cause the pulsing rate to increase to a dangerous level. (These remarks apply to both continuous and demand pacing; the timing circuit including capacitor 57 is operative in both cases.)

In the circuit of FIG. 3 any battery failure causes an increase in the pulsing rate; there is no danger of a decreased rate. Moreover, a failure of as many as three of the five batteries causes an increase in the pulsing rate of only approximately 33 percent.

FIG. 4 shows the battery arrangement of FIG. 3 more clearly. The charging potential $V_1$ is equal to the sum of the potentials of the five batteries. The threshold potential $V_2$ is determined by the voltage drop across resistor 12. Current flows from the batteries through the two diodes and the resistor. (The number of diodes used in any pacer depends upon the desired difference between the charging and threshold potentials.) Assuming that there is an essentially constant 0.30-volt drop across each diode, it is apparent that the threshold potential $V_2=V_1-0.60$. Even if one or more batteries fail, while both $V_1$ and $V_2$ decrease, the two potentials always differ from one another by 0.60 volt.

The charging current for capacitor 57 flows through potentiometers 35 and 37, and resistors 61 and 63. Assuming that the total resistance is R and the magnitude of the capacitor is C, the charging time constant is RC. Assuming further that the drops across resistors 61 and 63, and transistors T7 and T8, are small when the transistors conduct, so that capacitor 57 can be thought of as charging from ground toward $V_1$ during each charging cycle, it is apparent that the voltage $V$ across the capacitor as a function of time from the start of each charging cycle is expressed by the following equation:

$$V = V_1(1 - e^{-t/RC}). \quad (1)$$

Assuming still further that transistors T7 and T8 are triggered to conduction when the potential at the emitter of transistor T7 equals the threshold potential $V_2$ at its base, a pulse is generated when $$V_2 = V_1(1 - e^{-T/RC}) \quad (2)$$

where $T$ is the time period of the charging circuit. With a small enough pulse width, $T = 1/f$, where $f$ is the pulsing rate. Substituting $1/f$ for $T$ in equation (2), it can be shown that $$f = -1/(RC) \ln(1 - V_2/V_1) \quad (3)$$

and since $V_2 = V_1 - 0.60$, as $V_1$ varies (as the batteries age and eventually fail) so does $V_2$. The frequency of the generator changes with the total potential $V_1$ as follows:

$$f = -1/(RC) \ln\left(1 - \frac{V_1 - .60}{V_1}\right) \quad (4)$$

Initially, $V_1 = 5(1.35) =$ volts and the rated frequency $f_o$ is $$f_o = -1/(RC) \ln\left(1 - \frac{6.75 - .60}{6.75}\right) \quad (5)$$

The normalized pulse frequency $F_N$, that is, the ratio of the actual frequency to the rated frequency, is thus $F_N = f/f_o$, or $$F_N = \frac{\ln\left(1 - \frac{6.75 - .60}{6.75}\right)}{\ln\left(1 - \frac{V_1 - .60}{V_1}\right)} \quad (6)$$

$F_N$ is plotted in FIG. 5 as a function of $V_1/6.75$ rather than $V_1$. This allows the percentage increase in frequency to be determined for any ratio of the actual value of $V_1$ to the initial value (6.75). For example, if the charging potential ($V_1$) drops to 90 percent of its initial value, since $F_N$ increases to approximately 1.04, there is only a 4 percent increase in the frequency.

Suppose that one battery fails so that $V_1$ drops from 6.75 volts to 5.40 volts. In such a case there is approximately only a 10 percent increase in frequency. If two batteries fail and $V_1$ drops from 6.75 volts to 4.05 volts, the frequency increases by approximately only 28 percent. And if three of the five batteries fail with $V_1$ decreasing from 6.75 volts to 2.70 volts, the frequency increases by approximately 60 percent.

Actually, the last three examples as well as the plot of FIG. 5 are theoretical only. In the unit constructed, it was found that if one battery fails the frequency increases by 10 percent, if two batteries fail the frequency increases by 20 percent and if three batteries fail the frequency increases by only 33 percent. The discrepanices between the theoretical and actual values is due to the fact that the theoretical analysis neglected the voltage drops across transistors T7 and T8, and resistors 61 and 63. Furthermore, the theoretical analysis assumed that the transistors are triggered to conduction when the potential at the emitter of transistor T7 equals the potential at its base. It is actually necessary for the emitter potential to be slightly greater than the base potential before the transistor turns on. The results achieved in practice are even better than the theoretical results—failures of three of the five batteries produce an increase of only 33 percent in the frequency.

Actually, the last three examples as well as the plot of FIG. 5 are theoretical only. In the unit constructed, it was found hat if one battery fails the frequency increases by 10 percent, if two batteries fail the frequency increases by 20 percent and if three batteries fail the frequency increases by only 33 percent. The discrepancies between the theoretical and actual values is due to the fact that the theoretical analysis neglected the voltage drops across transistors T7 and T8, and resistors 61 and 63. Furthermore, the theoretical analysis assumed that the transistors are triggered to conduction when the potential at the emitter of transistor T7 equals the potential at its base. It is actually necessary for the emitter potential to be slightly greater than the base potential before the transistor turns on. The results achieved in practice are even better than the theoretical results —failures of three of the five batteries produce an increase of only 33 percent in the frequency.

One of the advantages of the circuit of FIG. 3 is that frequency changes are in one direction only. No battery failure (or multiple battery failures) can cause the frequency to decrease; battery failures only contribute to an increase in the pulsing rate. By monitoring the patient, the physician can determine the state of the batteries. For example, if the pulsing rate has increased by 20 percent, the physician is made aware of the fact that two of the five batteries have failed or, alternatively, that the total battery supply as a result of partial reductions in the potentials of several batteries has been reduced by 40 percent. In this way the physician can be made aware in ample time that corrective measures may have to be taken.

The major advantage of a pacer constructed in accordance with the principles of my invention is that the proper functioning of no battery is critical. (While the failure of battery 3, for example, may cause the illustrative pacer to switch from the demand to the continuous mode, this is not a dangerous condition.) This is due to the fact that the threshold potential $V_2$ is derived from all five batteries connected in series. The threshold potential is equal to the total (charging) potential, less a fixed drop (0.60 volt in the illustrative embodiment of the invention). The system is redundant in the sense that even if three batteries fail there are enough batteries remaining which continue to provide stimulation at a safe rate. (If four of the five batteries fail, pacing stops. It is more dangerous to the patient for the pacing rate to be excessive than it is for pacing to stop altogether.) In a pacer designed in accordance with the principles of my invention, individual and even multiple battery failures are not hazardous insofar as the pulsing rate is concerned.

Although the invention has been described with reference to a particular embodiment, it is to be understood that this embodiment is merely illustrative of the application of the principles of the invention. For example, the timing circuit can include a charging-discharging capacitor whose discharge from a maximum level toward the threshold potential determines the pulse rate, a decrease in the capacitor voltage to the threshold potential causing a reversal from the discharging state to the charging state. Thus numerous modifications may be made in the illustrative embodiment of the invention and other arrangements may be devised without departing from the spirit and scope of the invention.

What is claimed is:

1. A pacer comprising electrodes for connection to a patient's heart, pulsing circuit means for supplying a stimulating electrical pulse to said electrodes, timing circuit means responsive to beating action of said patient's heart for controlling the operation of said pulsing circuit means, means for establishing minimum, maximum, and threshold levels, said timing circuit means including a charging-discharging element for charging and discharging between said minimum and maximum levels, first and second sources of potential for energizing said pacer, said first source comprising a plurality of series connected batteries, means for controlling a reversal in the charging of said element responsive to the potential thereof reaching said threshold level, means for establishing said maximum and threshold levels proportional respectively to the magnitudes of said first and second sources of potential, the magnitude of said first source of potential varying with the potentials of said series-connected batteries, and means for deriving said second source of potential from said series-connected batteries to have a magnitude equal to that of said first source of potential less a fixed potential drop.

2. A pacer in accordance with claim 1 wherein said second potential source deriving means includes diode means and resistance means connected in series across said series-connected batteries.

3. A pacer in accordance with claim 2 wherein aid second source of potential is at the junction of said diode means and said resistance means, said diode means being connected between said first and second sources of potential.

4. A pacer in accordance with claim 3 wherein aid charging-discharging element is a capacitor and said reversal controlling means controls a reversal from the charging of said capacitor to the discharging of said capacitor when the potential of said capacitor increases to said threshold level during the charging thereof.

5. A pacer in accordance with claim 4 wherein said timing circuit includes impedance means connected in series with said capacitor across said series-connected batteries, and said reversal controlling means includes transistor means having an emitter terminal coupled to said capacitor and a base terminal coupled to said second source of potential.

6. A pacer in accordance with claim 1 wherein said charging-discharging element is a capacitor and said reversal controlling means controls a reversal from the charging of said capacitor to the discharging of said capacitor when the potential of said capacitor increases to said threshold level during the charging thereof.

7. A pacer in accordance with claim 6 wherein said timing circuit includes impedance means connected in series with said capacitor across said series-connected batteries, and said reversal controlling means includes transistor means having an emitter terminal coupled to said capacitor and a base terminal coupled to said second source of potential.

8. A pacer comprising electrodes for connection to a patient's heart, a pulsing circuit for supplying a stimulating electrical pulse to said electrodes, timing circuit responsive to beating action of said patient's heart for controlling the operation of said pulsing circuit, means for establishing minimum, maximum, and threshold levels, said timing circuit including a charging-discharging element for charging and discharging between said minimum and maximum levels, first and second sources of potential for energizing said pacer, said first source comprising a plurality of series-connected batteries, means for controlling a reversal in the charging of said element responsive to the potential thereof reaching said threshold level, means for controlling said maximum and threshold levels to be proportional respectively to the magnitudes of said first and second sources of potential, the magnitude of said first source of potential varying with the potentials of said series-connected batteries, and means connected across the two ends of said series-connected batteries for deriving said second source of potential from all of said batteries such that a reduction in the potential of any one of said plurality of batteries causes a substantially equal decrease in the magnitudes of said first and second sources of potential.

9. A pacer in accordance with claim 8 wherein said second potential source deriving means includes diode means and resistance means connected in series across said series-connected batteries.

10. A pacer in accordance with claim 9 wherein said second source of potential is at the junction of said diode means and said resistance means, said diode means being connected between said first and second sources of potential.

11. A pacer in accordance with claim 10 wherein said charging-discharging element is a capacitor and said reversal controlling means controls a reversal from the charging of said capacitor to the discharging of said capacitor when the potential of said capacitor increases to said threshold level during the charging thereof.

12. A pacer in accordance with claim 11 wherein said timing circuit includes impedance means connected in series with said capacitor across said series-connected batteries, and said reversal controlling means includes transistor means having an emitter terminal coupled to said capacitor and a base terminal coupled to said second source of potential.

13. A pacer in accordance with claim 10 wherein all of said batteries are fully equivalent to each other in that a change in any battery has the same effect on the pacer operation as the same change in any other battery.

14. A pacer in accordance with claim 8 wherein all of said batteries are fully equivalent to each other in that a change in any battery has the same effect on the pacer operation as the same change in any other battery.

* * * * *